July 22, 1969     H. W. DIETERT     3,456,924
METHOD OF AND APPARATUS FOR PREMIXING
GRANULAR MATERIAL ADDITIVES
Filed March 27, 1967     2 Sheets-Sheet 1

INVENTOR
HARRY W. DIETERT
BY Whittemore, Hulbert
& Belknap
ATTORNEYS

July 22, 1969
H. W. DIETERT
3,456,924
METHOD OF AND APPARATUS FOR PREMIXING
GRANULAR MATERIAL ADDITIVES
Filed March 27, 1967
2 Sheets-Sheet 2
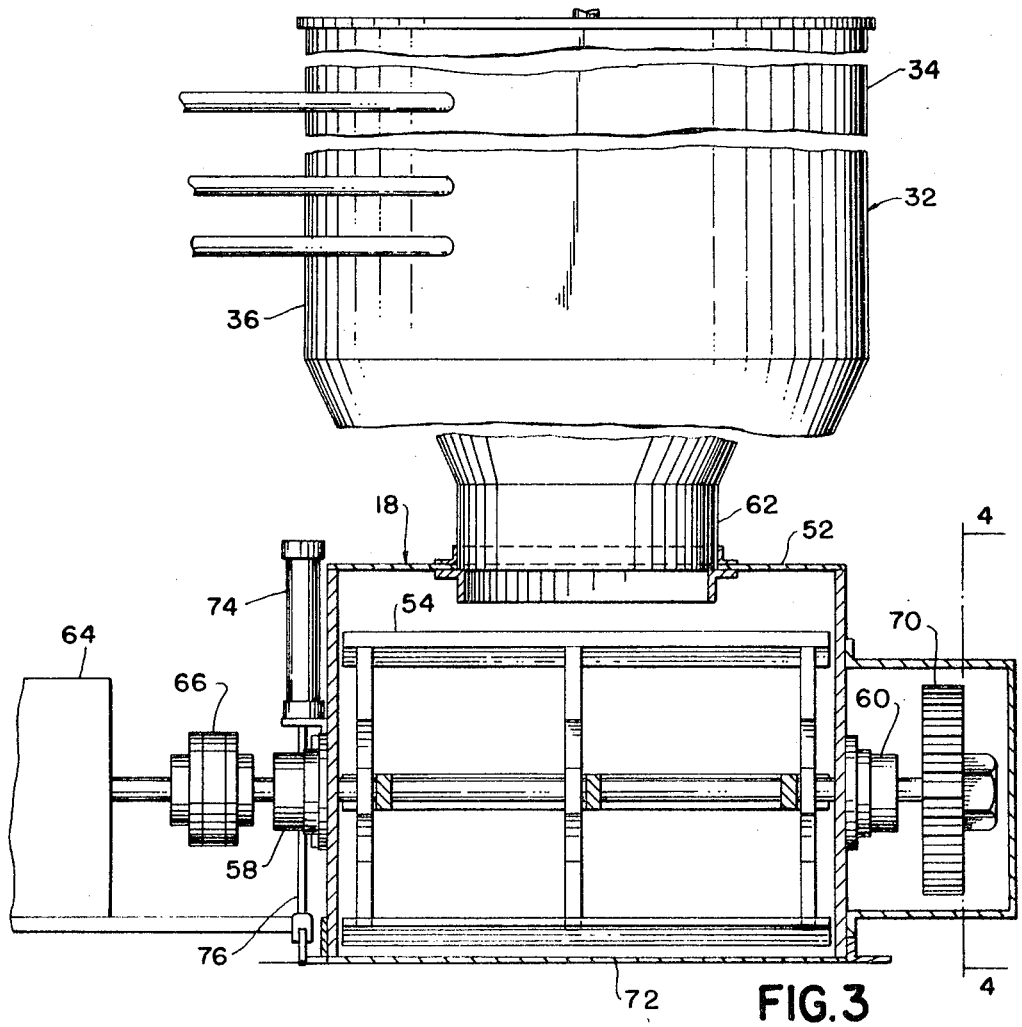
FIG. 3
FIG. 4
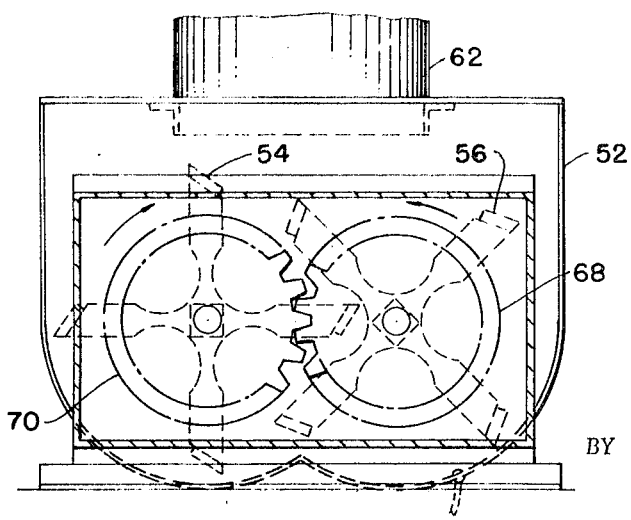
INVENTOR
HARRY W. DIETERT
BY Whittemore, Hulbert
& Belknap
ATTORNEYS United States Patent Office 3,456,924
Patented July 22, 1969

3,456,924
METHOD OF AND APPARATUS FOR PREMIXING GRANULAR MATERIAL ADDITIVES
Harry W. Dietert, Kerrville, Tex., assignor to Harry W. Dietert Co., Detroit, Mich., a corporation of Michigan
Filed Mar. 27, 1967, Ser. No. 626,051
Int. Cl. B28c 7/12; B01f 7/10
U.S. Cl. 259—148                        9 Claims

ABSTRACT OF THE DISCLOSURE

A method of preparing granular material additives comprising first mixing non-cohesive additives and water to coat the non-cohesive additives with water but leave no free water and subsequently adding the mixed non-cohesive additives and water to the cohesive additives while mixing the cohesive additives and mixing the cohesive additives and the mixed non-cohesive additives and water to provide a granular material additive which is dust free and includes no clay balls, and structure for accomplishing the method.

Background of the invention

The invention relates to the treatment of granular material and refers more specifically to a method of and means for preparing additives to be added to foundry sand without the formation of clay balls or objectionable dust.

In the past granular material additives, such as Western and Southern bentonite, fire clay, sea coal, wood flour and silica sand have been added to foundry sand in a mixer in a dry state either as the returned sand is dumped into the mixer or subsequent to the dumping of the sand into the mixer. The addition of the additives in the dry state to the foundry sand is objectionable since air is generally used to remove dust created during the mixing of the sand and additive and air is often used to cool the sand in the mixer whereby a substantial loss of additives is common since they are in a fine powdered form. Air dampers are sometimes used to prevent the loss of additives in foundry sand mixers during the mixing cycle but are only partly effective.

Also, additives blended and tempered with from, for example eight to fourteen percent water which mix is free of dust are sometimes purchased from foundry supply firms for the purpose of mixing with the foundry sand without creating dust or loss of additives during mixing and cooling. This method of preventing loss of additives in mixing of foundry sand is also objectionable in that the prepared additives are not blended of the right material and in the right proportions for each desired mix. Additionally with such blended additives for foundry sand freight must be paid on the water with which the additives are mixed.

A more desirable method would be to prepare the blended additives in the foundry. The present method of preparing the blended additives comprises blending the additives, such as bentonite, fire clay, carbonaceous materials and others in the dry state in a conventional mixer. Water is then added to the additives blended in the dry state and the mixing is continued. After a predetermined mix period the mixed additives and water are dumped into a conventional pulverizer which breaks clay balls formed in the mixed additives and water when water is added to the cohesive or clay bearing additives, such as bentonite, fire clay or cereal binders.

Summary of the invention

In accordance with the present invention a method is provided for preparing blended additives and water without the formation of clay balls by avoiding having water in a solid or spray form strike the clay bearing additives. In accordance with the invention the materials not containing an appreciable amount of clay substance, that is the non-cohesive materials, such as sea coal, pitch, silica flour, wood flour, cereal flours or silica sand are placed in a mixer and the proper total amount of water is added to this material. The non-cohesive material and water is then mixed to form a wetted blend which does not drip moisture and can be described as tempered on the heavy side. This wetted blend could contain as much as twice the total moisture content of the prepared blend of materials. Next the wetted blend is passed into a mixer containing clay substance additives, such as bentonite, fire clay or cereal binders and the wetted non-cohesive material and cohesive materials are mixed.

This method of producing a blended granular material additive will permit the wetted clay free material particles to pick up clay bearing material and become coated with the clay bearing material. Since the water is finely held by the clay free material, the clay bearing materials do not form clay balls.

Brief description of the drawings

FIGURE 3 is an enlarged broken and partly broken away elevation view of a portion of the additive blending structure as illustrated in FIGURE 1.

Description of the preferred embodiments

Figures 1, 2:
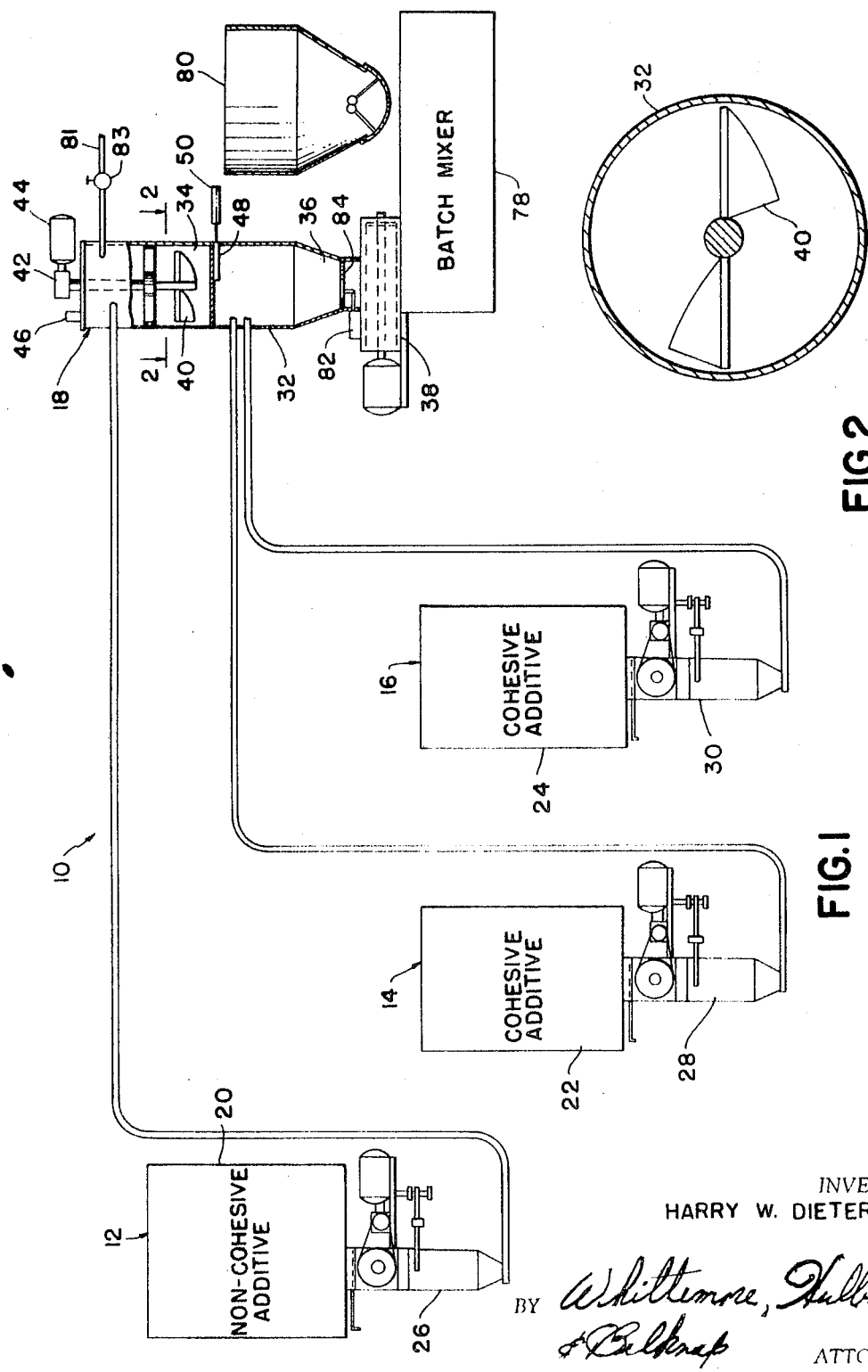
FIGURE 1 is a partly broken away diagrammatic representation of granular material conditioning apparatus including additive blending structure constructed in accordance with the invention for carrying out the method of the invention.
FIGURE 2 is an enlarged transverse cross section of a portion of the additive blending structure of FIGURE 1 taken substantially on the line 2—2 in FIGURE 1.

FIGURE 4 is a partial section view of a portion of the additive blending structure of FIGURE 3 taken in the direction of arrows 4—4 in FIGURE 3.

The additive blending structure 10, illustrated best in FIGURE 1, includes the storage and transferring structures 12, 14 and 16 and the premixing structure 18.

The storage and transferring structures 12, 14 and 16 includes storage bins 20, 22 and 24, respectively. The storage bin 20 is provided for a non-cohesive or non-clay bearing additive for foundry sand, such as sea coal, as indicated. The storage bins 14 and 16 are provided for cohesive or clay bearing additives, such as Western bentonite and Southern bentonite, respectively, also as shown.

The weighing and transfer apparatus 26, 28 and 30 may be as shown in Patent No. 3,168,926, dated Feb. 9, 1965. Alternatively any other weighing and transfer apparatus for weighing and transferring fine powdered or granular material from a remote storage area to a place of use in measured quantities may be provided in place of the weighing and transfer apparatus 26, 28 and 30.

The premixing structure 18 includes a tank 32 having an upper portion 34 for receiving the non-cohesive additive and water and a lower portion 36 for receiving and storing a charge of cohesive additive. Mixing structure including plows 40, gear box 42 and motor 44 is provided in the upper receiver portion 34 of the tank 32, as shown. A dust arrester 46 and a discharge door 48 operated on actuation of the hydraulic piston 50 are also provided in conjunction with the receiver portion 34 of the tank 32.

The premixer 38 provided in conjunction with the lower storage receiver portion 36 of the tank 32 is best shown in FIGURES 3 and 4. The premixer 38 includes a mixing box 52. The lawn mower or parallel wheel type mixer blades 54 and 56 are journalled in bearings 58 and 60 at the ends of the box 52 for parallel rotation therein in the direction shown. Thus granular material fed into the mixing box 52 from the bottom of the tank 32 through the chute 62 will be drawn downward through the center of the blades 54 and 56 and will be thrown upward along the sides of the mixing box 52.

A motor 64 is connected through clutch 66 to directly drive one of the blades 54. The other blade 56 is driven through the meshed gears 68 and 70 connected to the opposite ends of the mixing blades 54 and 56 from the motor 64. The bottom 72 of the mixing box 52 may be opened by cylinder 74 on extension of piston rod 76 to empty the mixing box 52 when the additives positioned therein are thoroughly mixed to dump the thoroughly mixed additives containing no clay balls or dust into the usual batch mixer 78 for foundry sand, a charge of which foundry sand may be delivered as desired from the batch hopper 80 shown positioned over the batch mixer 78.

In overall operation of the additive blending structure 10, the non-cohesive additives from bin 12 are charged into the upper portion 34 of the tank 32 by the weighing and transferring apparatus 26. With the discharge door 48 associated with the upper part 34 of the tank 32 closed water is added to the non-cohesive additives through the water conduit 81 and metering valve 83. The water and non-cohesive additives are then mixed by the mixing apparatus in the upper portion 34 of tank 32.

The cohesive additives are then discharged from the storage receiver portion 36 of tank 32 on operation of the piston and cylinder structure 82 through the door 84 and chute 62 into the premixer 38, the door 72 of which is closed. The cohesive additives are then mixed in the premixer 38.

Subsequently the mixed non-cohesive material and water discharged through doors 48 and 84 into the operating premixer. As indicated above the mixed non-cohesive material and water will at this time be heavy tempered but there will be no free water to form clay balls when the mix is added to the cohesive additives in the premixer.

The cohesive additives are then mixed in the premixer 38 with the mixed non-cohesive additives and water to form a blended additive which is aerated, fluffy, soft, lightweight and free of clay balls that will readily mix with other materials with greater ease than when water is added directly to additives in the mixer. The blended additives formed, as indicated above, also have a uniform color and texture which is desirable.

While one embodiment of the present invention has been disclosed in detail, it will be understood that other equipment may be used to effect the method of the invention, and modifications of the method of the invention are possible. Thus, for example, while it is desirable to use separate mixers for mixing the water and non-cohesive material and for mixing the mixed water and non-cohesive material with the cohesive material, a single mixer could be used for both mixing operations. It is the intention to include all embodiments and modifications as are defined by the appended claims within the scope of the invention.

What I claim as my invention is:

1. A method for preparing a mixture of non-cohesive material which is a non-clay bearing additive for foundry sand, such as sea coal, fluid and cohesive material which is a clay bearing additive for foundry sand, such as bentonite, comprising mixing the fluid and non-cohesive material to coat the particles of non-cohesive material, and subsequently mixing the cohesive material with the mixed fluid and non-cohesive material.

2. The method as set forth in claim 1 wherein a plurality of non-cohesive substances are mixed to provide the non-cohesive material.

3. The method as set forth in claim 1 wherein a plurality of cohesive substances are mixed to provide the cohesive material.

4. The method as set forth in claim 1 and further including mixing the cohesive material while the mixed non-cohesive material and fluid are mixed therewith.

5. The method as set forth in claim 1 and further including mixing a plurality of non-cohesive substances to provide the non-cohesive material, mixing a plurality of cohesive substances to provide the cohesive material and the fluid is water.

6. The method as set forth in claim 5 wherein the cohesive material is mixed while the mixed non-cohesive material and water is mixed therewith.

7. Structure for preparing a mixture of non-cohesive material, such as a non-clay bearing additive for foundry sand, fluid and a cohesive material, such as a clay bearing additive for foundry sand, comprising first mixing means for mixing non-cohesive material and fluid fed thereto, separate means for feeding non-cohesive material and for feeding fluid into the first mixing means, second mixing means for mixing mixed non-cohesive material and fluid and cohesive material, means for passing the mixed non-cohesive material and fluid from the first mixing means into the second mixing means and means for feeding cohesive material into the second mixing means.

8. Structure as set forth in claim 7, wherein the first mixing means is positioned vertically above the second mixing means and the means for passing the mixed non-cohesive material and fluid from the first mixing means to the second mixing means comprises a movable bottom on the first mixing means and means for selectively opening the movable bottom.

9. Structure as set forth in claim 7, wherein the second mixer comprises a mixing box, a pair of parallel wheel mixer blades journalled in the mixing box for parallel overlapping rotation therein and means for simultaneously driving the mixer blades in rotation to move downwardly at the overlapping portions thereof and upwardly along the sides of the mixing box, including a drive motor, a clutch and spur gear drive mechanism linearly connected together.

References Cited

UNITED STATES PATENTS

| | | | |
|---|---|---|---|
| 3,133,729 | 5/1964 | Albert | 259—147 |
| 3,134,579 | 5/1964 | Booth | 259—149 |

ROBERT W. JENKINS, Primary Examiner

U.S. Cl. X.R.

259—64, 165, 179